(12) United States Patent
Sommer

(10) Patent No.: US 10,213,941 B2
(45) Date of Patent: Feb. 26, 2019

(54) GRANULATING DEVICE WITH CUTTING KNIFE HEAD

(71) Applicant: MAAG AUTOMATIK GMBH, Grossostheim (DE)

(72) Inventor: Joachim Sommer, Seligenstadt (DE)

(*) Notice: Subject to any disclaimer, the term of this patent is extended or adjusted under 35 U.S.C. 154(b) by 397 days.

(21) Appl. No.: 15/144,648

(22) Filed: May 2, 2016

(65) Prior Publication Data

US 2016/0243729 A1 Aug. 25, 2016

Related U.S. Application Data

(63) Continuation of application No. PCT/EP2014/002909, filed on Oct. 29, 2014.

(30) Foreign Application Priority Data

Oct. 30, 2013 (DE) .................. 10 2013 018 239

(51) Int. Cl.
*B29B 9/06* (2006.01)
*B29B 13/04* (2006.01)
*B29K 105/00* (2006.01)

(52) U.S. Cl.
CPC .............. *B29B 9/065* (2013.01); *B29B 9/06* (2013.01); *B29B 13/045* (2013.01); *B29K 2105/0067* (2013.01)

(58) Field of Classification Search
CPC .............. B29B 9/06; B29B 9/065; B01J 2/20
See application file for complete search history.

(56) References Cited

FOREIGN PATENT DOCUMENTS

| DE | 1940703 U | 6/1966 |
|----|-----------|--------|
| DE | 1454863 A1 | 4/1969 |
| DE | 3212409 A1 | 10/1983 |
| JP | S48112857 U | 12/1973 |
| JP | S61179706 A | 8/1986 |
| JP | H05293799 A | 11/1993 |
| JP | H1076520 A | 3/1998 |
| JP | 2001105429 A | 4/2001 |
| WO | 20060227733 A1 | 3/2006 |

*Primary Examiner* — Timothy Kennedy
(74) *Attorney, Agent, or Firm* — Buskop Law Group, P.C.; Wendy Buskop

(57) ABSTRACT

A granulating device having a cutting knife head for cutting strands of melt into granules in a granulator housing. A perforated plate with die openings, from which strands of melt is extruded into the granulator housing, projects into the granulator housing. The cutting knife head, which has at least one cutting knife arranged radially on its outer circumference, is driven by a rotating drive shaft. The granulator housing has a first coolant inlet and an outlet for a mixture of coolant and granules. In addition, the granulator housing has a second coolant inlet that is independent of the first coolant inlet and that supplies a coolant flow for direct granule cooling to at least one co-rotating cooling nozzle bore in the cutting knife head through a coolant chamber and a stationary coolant pipe oriented coaxially to the drive shaft.

13 Claims, 6 Drawing Sheets

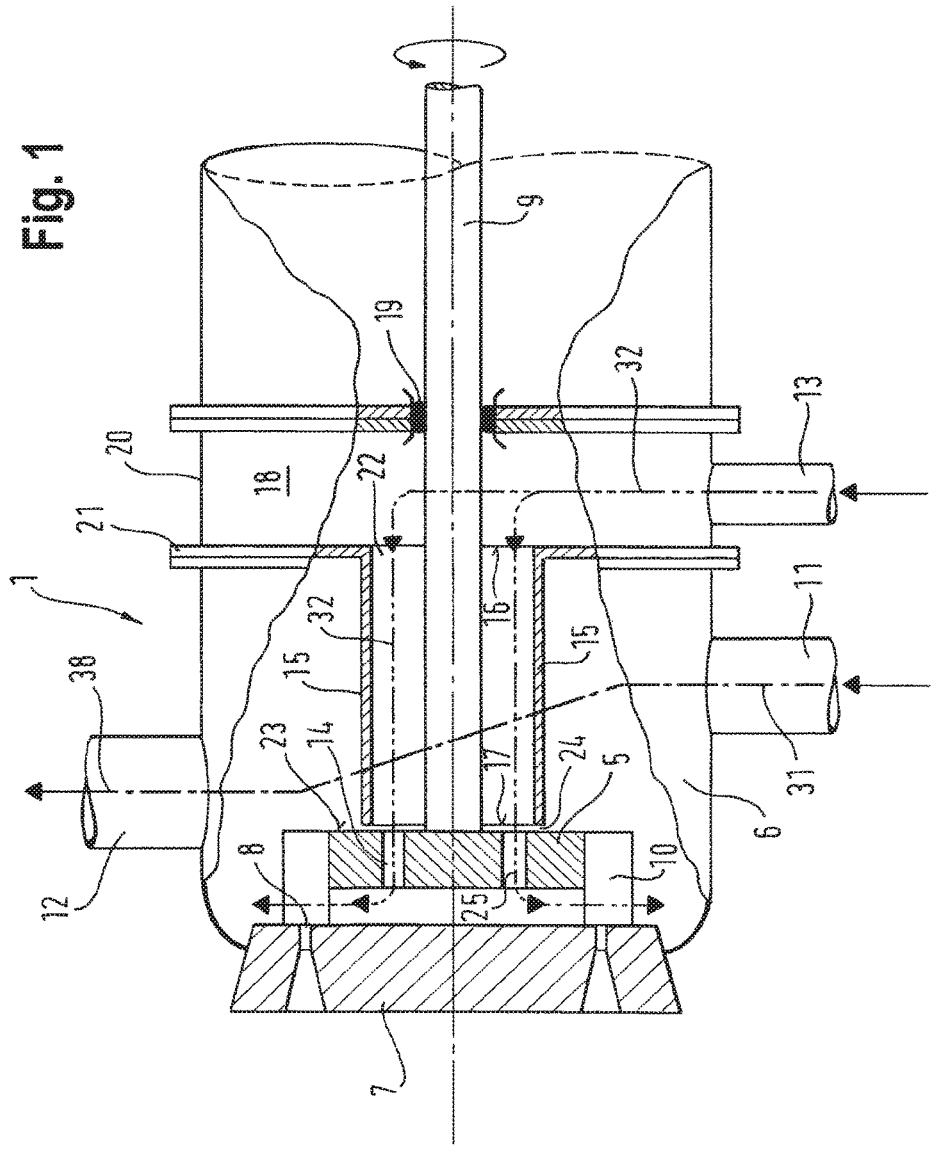

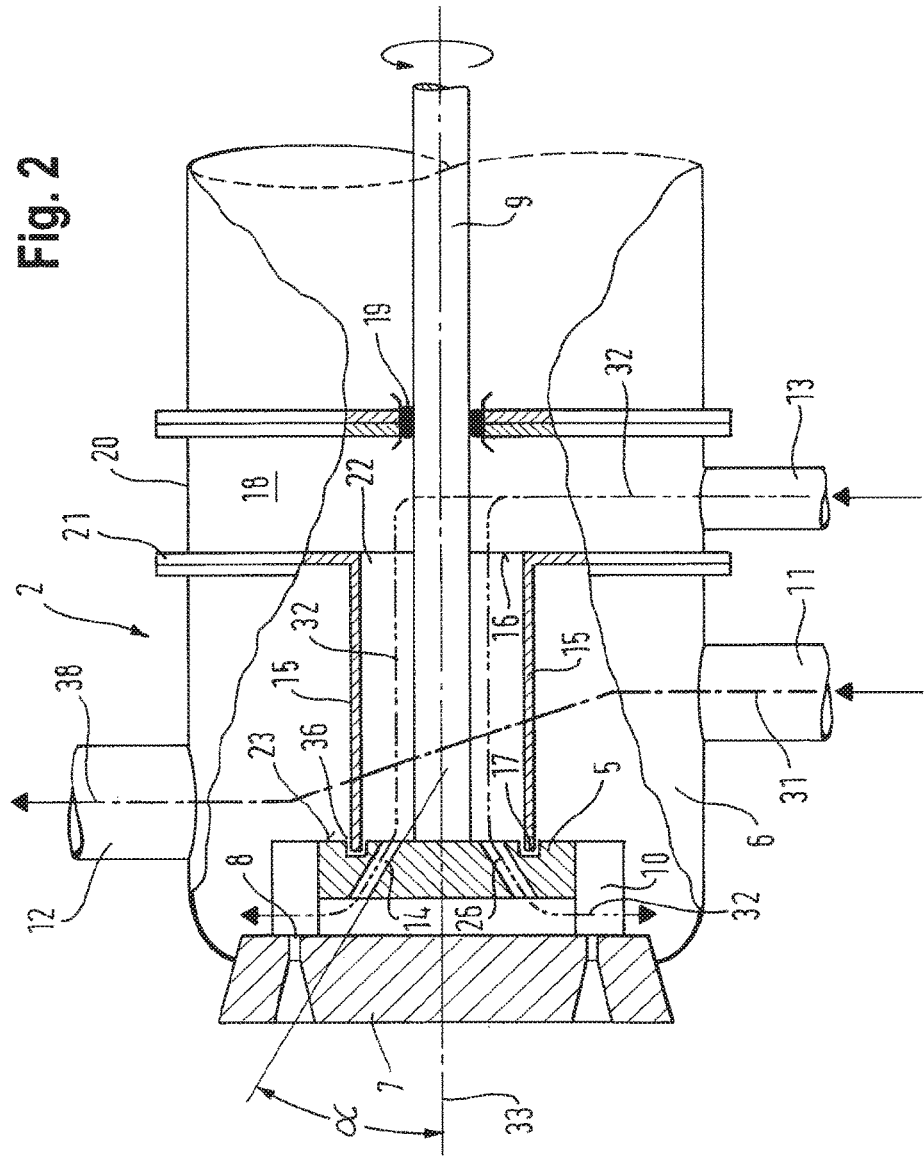

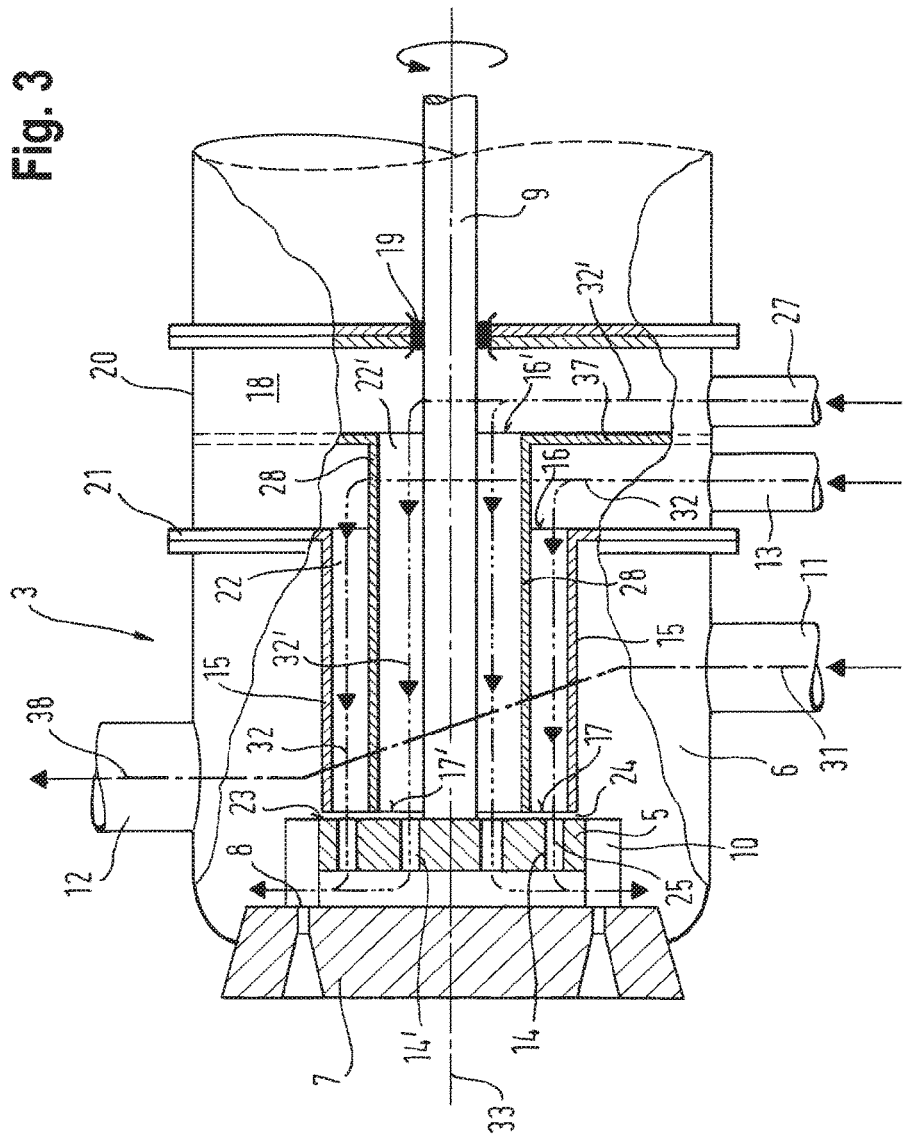

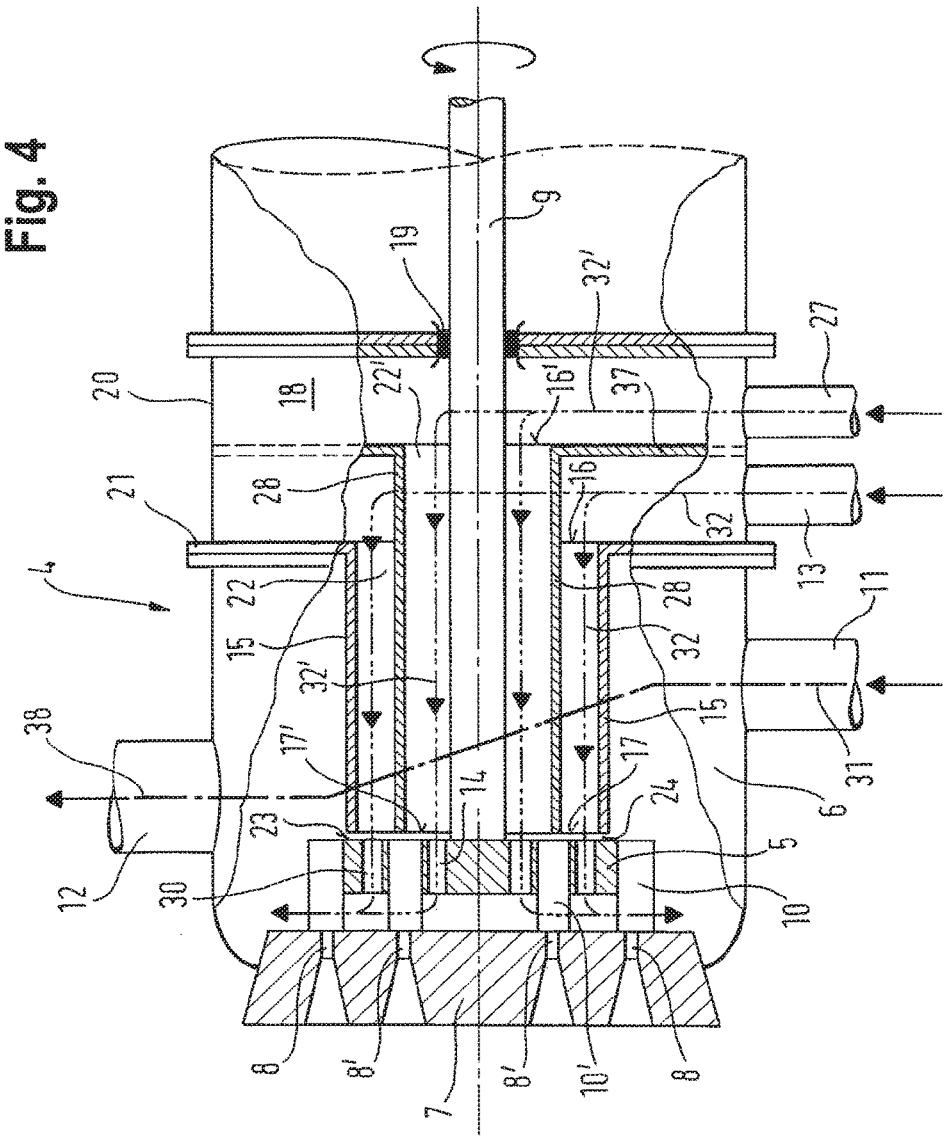

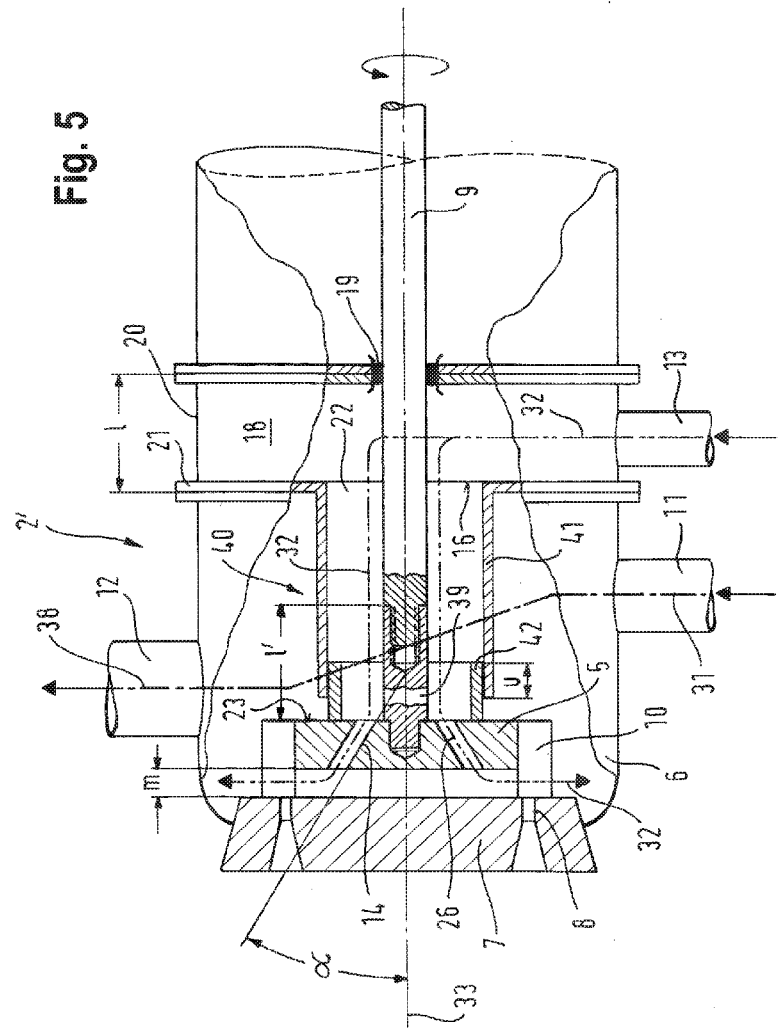

GRANULATING DEVICE WITH CUTTING KNIFE HEAD

CROSS REFERENCE TO RELATED APPLICATIONS

The present patent application is a Continuation that claims priority to and the benefit of co-pending International Patent Application No. PCT/EP2014/002909 filed Oct. 29, 2014, entitled "GRANULATING DEVICE WITH CUTTING KNIFE HEAD", which claims priority to DE Application No. 102013018239.5 filed Oct. 30, 2013. These references are hereby incorporated in their entirety.

FIELD

The present embodiments generally relate to a granulating device with a cutting knife head for cutting strands of melt into granules in a granulator housing.

BACKGROUND

The invention relates to a granulating device with a cutting knife head for cutting strands of melt into granules in a granulator housing. A perforated plate with die openings, from which strands of melt can be extruded into the granulator housing, projects into the granulator housing.

The cutting knife head, which has at least one cutting knife arranged radially on its outer circumference, is driven by a rotating drive shaft, wherein the cutting knife cuts the strands of melt emerging from the die openings to form granules. In this process, the granules are cooled by a fluid that enters the granulator housing through a first coolant inlet, and are discharged with the coolant from an outlet in the form of a mixture of coolant and granules.

Granulating devices of this nature are known to persons having ordinary skill in the art. Many of these devices use water as the coolant, and typically a coolant inlet is composed of an opening in a hollow drive shaft through which coolant enters the granulator housing and exits through the outlet of the granulator housing with the granules.

One disadvantage of the prior art is the limited cross-section of the coolant inlet in the hollow drive shaft of the cutting knife head, which restricts coolant flow and thus the amount of coolant delivered per unit time. This creates the risk that granules are not adequately cooled before they are delivered to the outlet, which can lead to clumping and sticking at the walls of the granulator housing and at the cutting knife head.

Another disadvantage is that coolant feed for discharging the granules cannot be regulated independently of the coolant feed to the cutting knife head, so that in the event of excessive central coolant feed for reliable discharge of the granules from the granulating device, there is a risk of the melt strand freezing in the die openings of the perforated plate. This risk is exacerbated due to the fact that the entire coolant flow consisting of the granule discharge flow and granule cooling flow in the prior art typically strikes the perforated plate directly through a discharge port that opens out in a funnel shape in the hollow drive shaft.

In addition, underwater granulating devices for thermoplastic plastics are known to persons having ordinary skill in the art. In these devices, the cutting knife head is typically concentrically enclosed by a hood. Typically, one part of cooling water flow is directed around the outside of the hood and a second part of cooling water flow is delivered to the cutting knife head through an opening in the hood. Located in the cutting knife head are bores that provide the cooling water that flows into the hood for direct granule cooling. The cooling water that flows outside around the hood is provided for the purpose of discharging the granules from the granulating device.

One disadvantage of this prior art underwater device is that the granule discharge flow for discharging the granules from the granulator housing cannot be controlled separately from the granule cooling flow that is intended to cool the granules directly during cutting, since the two coolant inlets are located in one common coolant inlet pipe. With this prior art device it is not possible to create an optimum balance between a granule discharge flow and a granule cooling flow in order to prevent clumping of the granules in the granule discharge flow in the event of insufficient cooling of the granules, and to avoid freezing of the melt strand in the die openings of the perforated plate in the event of excessively high granule cooling flow.

Furthermore, devices for the cutting, cooling, and removal of granules are known to persons having ordinary skill in the art. Typical designs utilize a drive shaft of a cutting knife head which is entirely or partially hollow in design and serves as a feed pipe for the cooling water and discharge water, and the cutting knife head has blade arms that likewise are hollow in design so that the cut-off granules entering the blade arm can be carried away therein with a water flush.

This type of granulating device has the disadvantage that the cutting knife head consisting of blade arms is extremely complex in its construction and the cross-section of the hollow drive shaft with the cutting knife head is limited, thus restricting the amount of coolant per unit time and allowing for a risk that the granules are not adequately cooled before they are delivered to an outlet, which can lead to clumping and sticking, both in the cutting blade arms and in the granulator housing.

Secondly, the coolant feed for discharging granules cannot be regulated independently of the coolant feed to the cutting knife head, so in the event of excessive central coolant feed for reliable discharge of the granules from the granulating device, there is a risk of the melt strand freezing in the die openings of the perforated plate, especially since the entire coolant flow consisting of the granule discharge flow and granule cooling flow is carried past the die openings of the perforated plate in this granulating device.

There is a need for a granulating device that ensures reliable control of a granule discharge flow for discharging the granules from the granulator housing, without sticking or clumping of the granules at walls and at the cutting knife head occurring as a result of inadequate coolant throughput in a granule discharge flow, and control of a granule cooling flow independent thereof that permits cooling directly at the cutting of the granules from the melt strands without the risk that freezing of the melt can occur in the die openings of the perforated plate.

The present embodiments meet this need.

BRIEF DESCRIPTION OF THE DRAWINGS

The detailed description will be better understood in conjunction with the accompanying drawings as follows:

FIG. 1 shows a schematic, partially cross-sectional view of a granulating device in a first embodiment of the invention.

FIG. 2 shows a schematic, partially cross-sectional view of a granulating device in a second embodiment of the invention.

FIG. 3 shows a schematic, partially cross-sectional view of a granulating device in a third embodiment of the invention.

FIG. 4 shows a schematic, partially cross-sectional view of a granulating device in a fourth embodiment of the invention.

FIG. 5 shows a schematic, partially cross-sectional view of a modification of a granulating device according to the second embodiment of the invention.

Figure 1A:
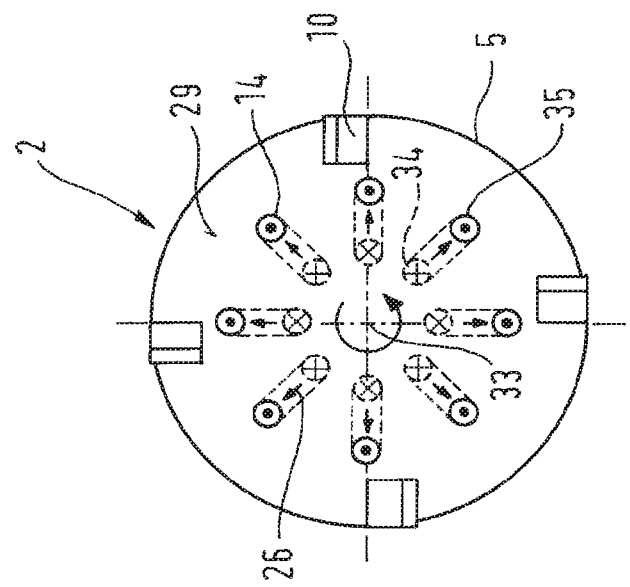
FIG. 1A shows a top view of a cutting knife head with associated coolant nozzle bores according to FIG. 1.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The invention relates to a granulating device with a cutting knife head for cutting strands of melt into granules in a granulator housing. A perforated plate with die openings, from which strands of melt can be extruded into the granulator housing, projects into the granulator housing.

One embodiment of the invention is a granulating device with a cutting knife head for cutting strands of melt into granules in a granulator housing. A perforated plate with die openings, from which strands of melt can be extruded into the granulator housing, can project into the granulator housing. The cutting knife head, which can have at least one cutting knife arranged radially on its outer circumference, can be driven by a rotating drive shaft. The granulator housing can have a first coolant inlet and an outlet for a granule discharge flow with a mixture of coolant and granules. In addition, the granulator housing can have a second coolant inlet that is independent of the first coolant inlet and which supplies a granule cooling flow for direct granule cooling to at least one co-rotating cooling nozzle bore in the cutting knife head through a coolant chamber and a stationary coolant pipe oriented coaxially to the drive shaft.

It is a crucial advantage of this invention that the granulating device has a first fluid inlet by means of which a granule discharge flow can be controlled with regard to temperature and flow rate independently of a granule cooling flow that permits granule cooling directly through the cooling nozzle openings of the cutter head.

The independence is achieved by a second coolant inlet which can be supplied independently of the first coolant inlet with a different temperature and a different amount of coolant per unit time. In this way it is possible to independently control or regulate a granule discharge flow by means of the first coolant inlet and a granule cooling flow by means of the second coolant inlet in order to produce optimal operating conditions in the granulating device in the different operating phases, such as the startup phase, production phase, and winding-down phase, without encountering operational disruptions due to freezing of melt strands in the die openings of the perforated plate or clumping and sticking due to inadequately cooled granules.

In another embodiment of the invention, the coolant chamber with the second coolant inlet and the stationary coolant pipe oriented coaxially to the drive shaft can be flange-mounted to the granulator housing as an add-on unit. This embodiment of the invention has the advantage that a uniform granulator housing can be provided to which different add-on units can be flange-mounted, wherein both the dimensions of the coolant chambers of these add-on units and the number of coolant pipes for supplying coolant directly to the rear side of the cutting knife head can vary.

In another embodiment, the coolant chamber can have at least one media-tight rotary feedthrough for the drive shaft. In this way, a drive motor can be arranged outside the coolant chamber and also outside the granulator housing, wherein the drive shaft projects through the coolant chamber and the coolant pipe by means of the rotary feedthrough and carries the cutting knife head, which rotates with the drive shaft.

In another embodiment, the coolant chamber can have an annular wall section, wherein a second coolant inlet is located in the wall section, so that coolant in this wall section can be delivered to the coolant chamber independently of the granule discharge flow through the granulator housing.

Proximate the granulator housing, the coolant chamber can have a coupling flange. In this design, this coupling flange has a central opening that surrounds the drive shaft at a distance. A first end of the coaxial coolant pipe can be arranged on this central opening in a media-tight or coolant-tight manner. In this way the coolant chamber can provide the possibility independent of the granule discharge flow in the granulator housing, to deliver a coolant flow to the co-rotating coolant nozzle openings in the cutting knife head into a region in which the granules are directly cut from the strands of melt emerging from the die openings of the perforated plate and to control the granule cooling.

Furthermore, with the aid of the coupling flange, a cooling chamber of this type can be flange-mounted to conventional granulator housings as a retrofit kit or retrofit device in order to be able to better control the granulation process without the need to replace or redesign the conventional granulator housing.

In order to be able to deliver the coolant to the rear side of the cutting knife head with the aid of the stationary coaxial coolant pipe, the coolant pipe of the coolant chamber can extend through the granulator housing to the rear side of the cutting knife head. There, the coolant pipe and the rear side of the cutting knife head form an annular slot. Even though a portion of the delivered coolant flow is emitted into the granulator housing, it is nonetheless possible through appropriate dimensioning of the slot size in relation to the number and diameter of coolant nozzle bores to direct a relatively high proportion of the coolant flow through the cooling nozzle bores in the cutting knife head directly to the cutting knives, and thus to the place where granules are produced, as a granule cooling flow. In this design, the inside radius of the coaxial coolant pipe is smaller than or equal to the outside radius of the cutting knife head at its rear side and is larger than an outside radius of rotation of the at least one co-rotating coolant nozzle bore.

The cutting knife head can have multiple cutting knives distributed about an outer circumference, and in other embodiments of the invention, a cooling nozzle bore can be associated with each of the cutting knives. Coolant nozzle bores of this type can either be parallel to the drive shaft or can have an inclined axis with an appropriate angle of inclination to the orientation of the drive shaft. Such an angle of inclination can be from 10 degrees to 60 degrees. It would also be possible to route the coolant in coolant nozzle bores at an angle of 90 degrees, wherein these bores, oriented substantially radially outward, preferably could be located in the region of the outer diameter and could be in fluid communication with the coolant pipe through their particular sections located radially inward.

As coolant fluid, cooling water with antifreeze additives and/or cooling water with an anticorrosive emulsion can be used. On the other hand, a coolant gas, for example cooling air, is also possible as coolant. The cooling air in this case can be delivered to the granulator housing through the first coolant inlet under suitably high pressure as a granule discharge air flow. In addition, the cooling air can be delivered through the second coolant inlet to a coolant chamber as a granule cooling flow independently of the granule discharge air flow and can maintain a highly effective cooling air flow in the vicinity of the cutting knives through the coolant nozzle bores in the cutting knife head directly at the process of cutting the strands of melt into granules.

In another embodiment of the invention, the granulating device can have three coolant inlets that are supplied with coolant independently of one another. Two of these coolant inlets can lead into the coolant chamber. Each coolant inlet of the coolant chamber can be in fluid connection with respective stationary coolant pipes that are oriented coaxially to one another and coaxially to the drive shaft. The two coaxially oriented coolant pipes are in fluid connection with multiple co-rotating coolant nozzle bores in the cutting knife head arranged on two concentric circles. In a granulating device of this type it is possible to radially vary the gradients of the cooling temperature on the front side of the cutting knife head and at the perforated plate.

In another embodiment of the invention, cutting knives can be arranged on the cutting knife head on multiple concentric circles, and be cooled by corresponding co-rotating coolant nozzle bores arranged on concentric circles. In this way it is possible to cool the granules cut by these knives directly and individually in the cutting position. This means that the cooling of the granules can be controlled and directed independently for each cutting knife ring through the different coolant nozzle bores of the coolant chamber. Also possible is an arrangement with multiple knives that, with their radial extent, each uniformly sweep the entire region of the concentric circles of different diameters.

Turning now to the Figures, FIG. 1 shows a schematic, partially cross-sectional view of a granulating device 1 in a first embodiment of the invention. The granulating device 1 has a cutting knife head 5 for cutting strands of melt into granules in a granulator housing 6. A perforated plate 7 with die openings 8 projects into the granulator housing 6. The cutting knife head 5 has cutting knives 10 arranged radially on its outer circumference, which are driven by a rotating drive shaft 9 and slide along the die openings of the perforated plate to cut strands of melt into granules. The granulator housing 6 has a first coolant inlet 11, which admits a coolant fluid, such as cooling water, which may be enhanced with anticorrosive emulsions or with antifreeze agents, into the cooling housing, wherein the coolant discharges the cut granules from the granulator housing 6 through an outlet 12. In FIG. 1 the path of a granule discharge flow 38 from the first coolant inlet 11, into which a granule-free inlet flow 31 flows, to the outlet 12, out of which the inlet flow filled with granules flows as the granule discharge flow 38, is marked with a dashed-and-dotted line. The granule cooling flow 32 also flows out with the granule discharge flow.

The cutting knife head 5 has cooling nozzle bores 14, the axes 25 of which are parallel to the drive axis 9 in this first embodiment of the invention. A stationary coolant pipe 15 supplies the co-rotating coolant nozzle bores 14 of the cutting knife head 5 with the coolant. In order to ensure the supplying of the co-rotating coolant nozzle bores 14 with coolant, the inside radius of the coaxial coolant pipe 15 is smaller than or equal to the outside radius of the cutting knife head 5 at its rear side 23 and is larger than an outside radius of rotation of the co-rotating coolant nozzle bores 14.

Between the stationary coolant pipe 15 and the rear side 23 of the rotating cutting knife head 5, an annular slot 24 remains through which coolant escapes into the granulator housing 6 and thus into the granule discharge flow 38. This escaping portion of a granule cooling flow 32, which is labeled with a double-dotted-and-dashed line, is no longer available for direct cooling at the location where the strands of melt emerging from the die openings 8 of the perforated plate 7 are cut into granules.

A first end 16 of the coolant pipe 15 located opposite the second end 17 in the region of the rear side 23 of the cutting knife head 5 is connected in a media-tight or coolant-tight manner to a coupling flange 21 that separates the granulator housing 6 from a coolant chamber 18. To this end, the coupling flange 21 has a central opening 22 arranged coaxially to the drive shaft 9.

An annular wall section 20 surrounds the coolant chamber 18, wherein a second coolant inlet 13 that is supplied with coolant independently of the first coolant inlet 11 is arranged in the wall section 20, so that the granule cooling flow 32 can directly supply the granules in the region of the cutting knives 10 with coolant through the coolant pipe 15 and the cooling nozzle bores 14, independently of the granule discharge flow 38.

Through a media-tight rotary feedthrough 19, the drive shaft 9 passes through the coolant chamber 18 and the granulator housing 6 to a rotationally fixed connection with the rear side 23 of the cutting knife head 5. Because the granule cooling flow 32 is deflected by the perforated plate 7 from a direction parallel to the drive shaft 9 into a centrifugal direction, the granules are subjected to intensive granule cooling immediately upon being cut. Independently of this, the granule discharge flow 38 flows around the stationary coolant pipe 15 and the rotating cutting knife head 5, picking up and discharging the granules produced. However, the granule cooling flow 32, like the granule discharge flow 38 together therewith, also leaves the granulator housing 6 through the outlet 12 and can thus also be available for granule transport there and for granule cooling there.

FIG. 1A shows a top view of a cutting knife head 5 with associated coolant nozzle bores 14, the axes of which are arranged on a circle around the axis of rotation 33 of the cutting knife head 5. In this first embodiment of the invention, a cooling nozzle bore 14 on the front side 29 of the cutting knife head 5 is associated with each cutting knife 10.

FIG. 2 shows a schematic, partially cross-sectional view of a granulating device 2 in a second embodiment of the invention. Components with the same functions as in FIG. 1 are labeled with the same reference symbols in the subsequent figures and are not discussed separately.

This second embodiment of the invention differs from the first embodiment according to FIG. 1 in that the axes 26 of the cooling nozzle bores 14 are not parallel to the drive axis 9, but instead are inclined at an angle $\alpha$ to the axis of rotation 33 of the cutting knife head 5. The angle of inclination a here can vary from 10 degrees to 60 degrees, wherein a preferred range for the angle α is from 15 degrees and the 30 degrees shown in FIG. 2.

As a result of the inclination of the axes 26 of the cooling nozzle bores 14, the granule cooling flow is more strongly directed toward the outer edge of the rotating cutting knife head 5, by which means the perforated plate 7 is supplied with less coolant at its center. In principle, a greater temperature gradient between the center and the outer edge of the perforated plate 7 can be achieved in this way. Moreover, in this second embodiment a labyrinth seal 36 is formed between the second end 17 of the coolant pipe 15 and an annular groove in the rear side 23 of the cutting knife head 5. As a result of this labyrinth seal 36, the portion of the granule cooling flow 32 that does not reach the perforated plate 7 is reduced, improving granule cooling.

Figure 2A:
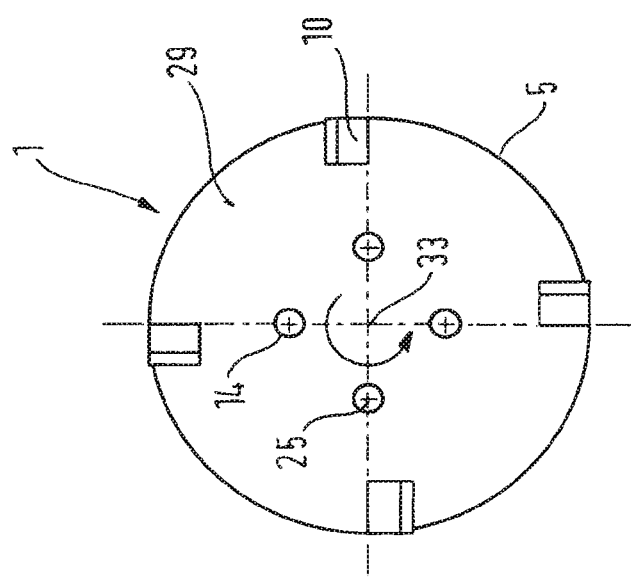
FIG. 2A shows a top view of a cutting knife head with associated coolant nozzle bores according to FIG. 2.

FIG. 2A shows a top view of a cutting knife head 5 with associated coolant nozzle bores 14 according to FIG. 2. On account of the inclination of the cooling nozzle bores 14 relative to the axis of rotation 33 of the cutting knife head 5, the inlets 34 on the rear side of the cutting knife head 5 are located on a circle having a smaller radius than the outlets 35. Moreover, in this second embodiment of the invention provision is made that not only does every cutting knife 10 have a cooling nozzle bore 14 directed toward it, but inclined cooling nozzle bores 14 are arranged in between the cutting knives, intensifying the centrifugal orientation of the granule cooling flow between the perforated plate and the cutting knife head 5.

FIG. 3 shows a schematic, partially cross-sectional view of a granulating device 3 in a third embodiment of the invention. This third embodiment of the invention differs from the preceding embodiments from FIG. 1 and FIG. 2 in that the coolant chamber 18 has two coolant inlets 13 and 27 that are independent of one another. With these coolant inlets 13 and 27, granule cooling flows 32 and 32' that are independent of one another can be delivered to corresponding cooling nozzle bores 14 and 14' through two coolant pipes 15 and 28 that are arranged coaxially to one another, wherein the cooling nozzle bores 14 and 14' are arranged on different circle radii of the rotating cutting knife head 5 and, as a result, the cooling nozzle bores 14 are supplied with coolant by a first cooling nozzle pipe 15, and the cooling nozzle bores 14' are supplied with coolant—that is delivered through the coolant inlet 27 of the coolant chamber 18—by a second coolant pipe 28, independently of the first cooling nozzle bores 14.

While the first coolant pipe 15 extends from a first end 16 to a second end 17, the second coolant pipe 28 extends from a first end 16' to a second end 17'. The first end 16' is connected in a media-tight or coolant-tight manner to a central opening 22', which is centrally located in a disk-shaped dividing wall 37 inside the coolant chamber 18. This dividing wall 37 separates the granule cooling flow 32 indicated by a dashed-and-double-dotted line from the granule cooling flow 32' indicated by a dashed-and triple-dotted line. With this granulating device 3, therefore, a temperature gradient between axis of rotation 33 and the cutting knives 10 can be regulated considerably more precisely.

FIG. 4 shows a schematic, partially cross-sectional view of a granulating device 4 in a fourth embodiment of the invention. In this fourth embodiment of the invention, two die openings 8 and 8' are provided in the perforated plate 7 that are arranged in an annular shape. Accordingly, two rows of cutting knives 10 and 10' that are arranged in mutually concentric circles are also provided on the cutting knife head 5. As shown in FIG. 3, two separate, independent granule cooling flows 32 and 32' are routed to these cutting knives 10 and 10' through the coolant inlet 13 and the coolant inlet 27 to the particular associated cooling nozzle bores 14 or 30, respectively. Consequently, the cutting knives 10 and 10' can be supplied independently of one another with granule cooling flows at a different temperature, different pressure, and different flow velocity.

FIG. 5 shows a schematic, partially cross-sectional view of a granulating device 2' of a modification of the second embodiment of the invention, as shown in FIG. 2. In order to compensate for cutting knife wear, the granulating device 2' has no groove of a labyrinth seal as in FIG. 2, into which the coolant pipe can extend at different depths as a function of cutting knife wear.

In this modification according to the invention, a telescoping coolant pipe 40 is used in place of a single-piece, stationary coolant pipe; the telescoping coolant pipe is composed of a first, stationary pipe section 41, which is connected in a media-tight or coolant-tight manner to the coupling flange 21 of the coolant chamber 18, and a second pipe section 42 that co-rotates with the cutting knife head 5. The second, co-rotating pipe section 42 can also be an integral component of the cutting knife head 5 or a pipe section that is integrally bonded to the cutting knife head 5. The telescoping overlap length u of the pipe sections 41 and 42 is greater here than the maximum possible wear length m of the cutting knives 10. In addition, the free space from the rear side of the blade carrier or of the cutting knife head 5 to the front edge of the pipe section 41 must be greater than the maximum possible travel of the cutting knife head 5 in the axial direction.

Another difference in the modified granulating device 2' as compared to the granulating device 2 in the second embodiment from FIG. 2 is that a drive shaft extension 39 with the length l' is provided instead of replacing the drive shaft 9 with a longer, continuous drive shaft in order to compensate for the additional length l of the wall section 20 of the coolant chamber 18 flange-mounted to the granulator housing 6. For this purpose, the length l' is matched to the length l of the wall section 20 and preferably is equal to the length l. Instead of the detachable, threaded connection between the drive shaft 9 and the drive shaft extension 39 shown here, a plug-in connection such as a bayonet connection can also be provided.

With the modification from FIG. 5, operation according to the invention of a suitably equipped granulating device is possible, just as operation in a standard configuration of a granulating device without a second coolant supply according to the invention is possible when this modification (wall section 20 and drive shaft extension 39) is omitted.

Even though at least exemplary embodiments have been presented in the preceding description, various changes and modifications may be undertaken. The specified embodiments are merely examples and are not intended to restrict in any way the scope of application, the applicability, or the configuration of the granulating device. Instead, the above description provides a person skilled in the art with a plan for implementing at least one exemplary embodiment of the granulating device, wherein numerous changes may be made to the function and design of the granulating device in the details of the granulating device described in exemplary embodiments without departing from the scope of protection of the appended claims and their legal equivalents.

While these embodiments have been described with emphasis on the embodiments, it should be understood that within the scope of the appended claims, the embodiments might be practiced other than as specifically described herein.

What is claimed is:

1. A granulating device with a cutting knife head for cutting strands of melt into granules in a granulator housing, wherein the granulating device comprises:
   a) a perforated plate with die openings, from which strands of melt is extruded into the granulator housing;
   b) a rotating drive shaft, which drives the cutting knife head, which has at least one cutting knife arranged radially on its outer circumference; and
   c) a first coolant inlet in the granulator housing and an outlet for a mixture of coolant and granules from the granulator housing; and
   wherein a second coolant inlet is provided that is supplied independently of the first coolant inlet, and the cutting knife head has at least one co-rotating cooling nozzle bore, and further wherein the second coolant inlet is in fluid communication with the rotating cooling nozzle bore through a coolant chamber and a stationary coolant pipe oriented coaxially to the drive shaft;
   and wherein the coolant chamber has an annular wall section, and further wherein the second coolant inlet is located in the annular wall section.

2. The granulating device of claim 1, wherein the coolant chamber with the second coolant inlet and the stationary coolant pipe oriented coaxially to the drive shaft, is flange-mounted to the granulator housing.

3. The granulating device of claim 1, wherein the coolant chamber has at least one media-tight rotary feedthrough for the drive shaft.

4. The granulating device of claim 1, wherein the coolant chamber has a coupling flange proximate the granulator housing.

5. The granulating device of claim 4, wherein the coupling flange has a central opening surrounding the drive shaft at a distance.

6. The granulating device of claim 5, wherein a first end of the coaxial coolant pipe is arranged on the central opening in a media-tight or a coolant-tight manner.

7. The granulating device of claim 1, wherein the stationary coolant pipe extends through the granulator housing to the rear side of the cutting knife head.

8. The granulating device of claim 7, wherein an annular slot is located between a second end of the stationary coolant pipe and the back of the rotating cutting knife head.

9. The granulating device of claim 1, wherein the inside radius of the stationary coolant pipe is smaller than or equal to the outside radius of the cutting knife head.

10. The granulating device of claim 1, wherein the cutting knife head has multiple cutting knives distributed about an outer circumference and a coolant nozzle bore is associated with each of the cutting knives.

11. The granulating device of claim 1, wherein an axis of the at least one cooling nozzle bore is parallel to the drive shaft.

12. The granulating device of claim 1, wherein an inclined axis of the at least one cooling nozzle bore has an angle of inclination relative to the drive shaft.

13. The granulating device of claim 1, wherein the granulating device has three coolant inlets that are supplied with coolant independently of one another, of which the coolant chamber has two coolant inlets and each coolant inlet of the coolant chamber is in fluid communication with stationary coolant pipes that are oriented coaxially to one another and coaxially to the drive shaft, wherein the stationary coolant pipes are in fluid communication with co-rotating coolant nozzle bores arranged on two concentric circles in the cutting knife head.

* * * * *